US008218864B2

(12) United States Patent  
Wang (10) Patent No.: US 8,218,864 B2  
(45) Date of Patent: Jul. 10, 2012

(54) METHOD AND DEVICE FOR MAINTAINING IMAGE BACKGROUND BY MULTIPLE GAUSSIAN MODELS

(75) Inventor: Chih-Ping Wang, Taipei Hsien (TW)

(73) Assignee: MSI Computer(Shenzhen)Co., Ltd., Shenzhen (CN)

( * ) Notice: Subject to any disclaimer, the term of this patent is extended or adjusted under 35 U.S.C. 154(b) by 583 days.

(21) Appl. No.: 12/536,857

(22) Filed: Aug. 6, 2009

(65) Prior Publication Data

US 2010/0215256 A1    Aug. 26, 2010

(30) Foreign Application Priority Data

Feb. 25, 2009   (TW) ................................ 98105948 A (51) Int. Cl.  
*G06K 9/00* (2006.01)

(52) U.S. Cl. ....................................... 382/165; 382/103

(58) Field of Classification Search .......... 382/164–165, 382/224–227, 173, 103, 107, 155, 159; 348/143, 348/152, 154, 169  
See application file for complete search history.

(56) References Cited

U.S. PATENT DOCUMENTS

| 6,999,600 | B2 * | 2/2006 | Venetianer et al. | 382/103 |
| 7,418,113 | B2 * | 8/2008 | Porikli et al. | 382/103 |
| 7,664,329 | B2 * | 2/2010 | Boregowda et al. | 382/225 |
| 2007/0286520 | A1 * | 12/2007 | Zhang et al. | 382/264 |

* cited by examiner

*Primary Examiner* — Ishrat I Sherali  
(74) *Attorney, Agent, or Firm* — Rabin & Berdo, P.C.

(57) ABSTRACT

A method maintaining an image background by multiple Gaussian models utilized to a device includes the following steps. First, the device captures an image frame having pixels to obtain background information, and then calculates the background information to establish a primary Gaussian model. Next, the device captures continuous image frames in a time period to obtain and calculate graphic information for establishing a secondary Gaussian model, and then repeats the steps to establish multiple secondary Gaussian models. Finally, the device compares two secondary Gaussian models, and then updates learning for the primary Gaussian model by the secondary Gaussian model if the graphic information of the secondary Gaussian models are attributable to the background information, or maintains the background information of the primary Gaussian model without updating the learning if anyone of the graphic information of the two secondary Gaussian models is unattributable to the background information.

19 Claims, 5 Drawing Sheets

METHOD AND DEVICE FOR MAINTAINING IMAGE BACKGROUND BY MULTIPLE GAUSSIAN MODELS

CROSS-REFERENCES TO RELATED APPLICATIONS

This non-provisional application claims priority under 35 U.S.C. §119(a) on Patent Application No. 98105948 filed in Taiwan, R.O.C. on Feb. 25, 2009, the entire contents of which are hereby incorporated by reference.

BACKGROUND OF THE INVENTION

1. Technical Field

The present invention relates to methods and devices for maintaining an image background, and more particularly, to a method and device for maintaining an image background by comparing a plurality of Gaussian models.

2. Related Art

Currently, to precisely detecting the moving object under a circumstance of changing background, moving-object detection techniques typically perform a learning process using an adapted-background technology for the changing background. To the detection systems, it is impossible to directly determine whether input pixels are attributable to a foreground or a background, the received pixels are usually added to a background model with a given corresponding weighting. For example, the more often a pixel or the like thereof is detected, the greater the weight value assigned to it. Pixels detected may be divided into two categories according to a threshold value; wherein the pixels with larger weight value are assigned as the background and the pixels with smaller weight value are assigned as the foreground. Therefore, the background is repeatedly updated and the foreground is separated from it, in order to locate the moving object.

Figure 1:
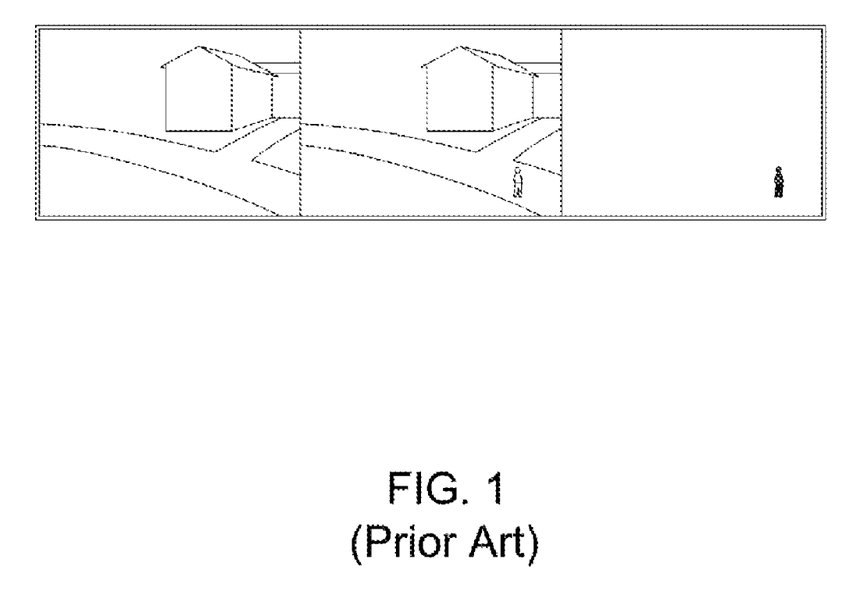
FIG. 1 is a schematic view of conventional background subtraction in the prior art.

However, it is possible for the foreground to be learned and incorporated into the background due to overstaying, or the foreground's marginal color may be similar to the color of the background and change the background color, both of which may cause misdetermination of the foreground. Such situations contribute to misinterpretation of the foreground. To address these problems, a common moving-object detection technique is to use background subtraction. As shown in FIG. 1, a picture is first captured in the frame when no object is moving in the frame. Next, every captured picture from the background is subtracted, and its absolute value obtained. In this way, when an object is shown in the frame, the object may be differentiated by means of the subtracted pictures.

When the background is affected by light, wind, or waves, it is necessary to provide a background-sensitive learning processing in response to changes of the background, such as a learning process based on a mixed Gaussian model. A mixed Gaussian model involves describing every pixel in the background by means of multiple Gaussian distributions that include an average and a covariance. Taking an RGB representation as an example, the average is the pixel RGB value, and the covariance is the scope of the Gaussian distribution. In a learning process based on a mixed Gaussian model, every Gaussian distribution is assigned a weight value, and the Gaussian distributions together cover the foreground and the background, allowing the foreground to be distinguished from the background according to the weighting.

Figure 2:
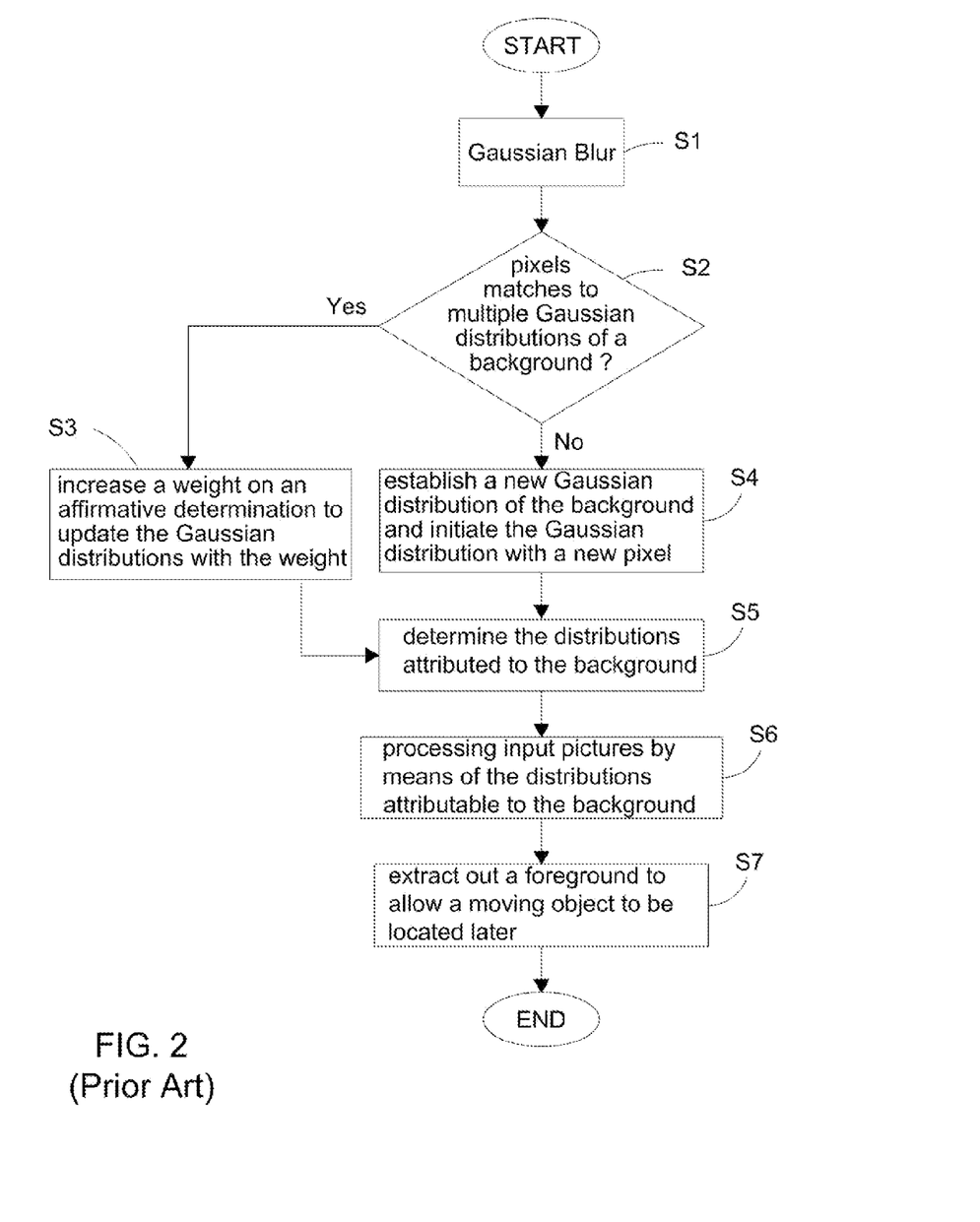
FIG. 2 is a flowchart of a learning process based on a conventional mixed Gaussian model in the prior art.

Referring to FIG. 2, which is a learning process based on a conventional mixed Gaussian model. The learning process includes the following process: performing a Gaussian blur on a new picture to remove the effect of noise partially (S1); determining whether pixels of the new picture matches to multiple Gaussian distributions of a background (S2); increasing a weight on an affirmative determination to update the Gaussian distributions with the weight (S3), wherein updating the Gaussian distributions is to update the weight involves updating an average and a covariance; establishing a new Gaussian distribution of the background upon a negative determination to replace the Gaussian distribution having the least weight by the new Gaussian distribution and initiate the Gaussian distribution with a new pixel (S4); determining a threshold value according to the weights of the distributions, so as to determine the distributions attributed to the background to be discerned according to the threshold value (S5); processing input pictures by means of the distributions attributable to the background (S6); and extracting out a foreground to allow a moving object to be located later (S7).

However, despite their purpose of maintaining background images, the two methods described previously both fail to overcome the drawbacks of the prior art, that is, background-based learning is likely to be misinterpreted whenever the foreground overstays or the marginal color of the foreground approximates the color of the background. This is because an overstayed foreground has a relatively large weight, and is therefore likely to be mistaken for a background. Likewise, if the marginal color of a foreground approximates the color of the background and a Gaussian distribution is considered attributable to the background, the average of the Gaussian distribution will vary, allowing the background and the foreground to be equal in color, thus resulting in misinterpretation. Hence, the inventor of the present invention and persons skilled in the art are confronted with an issue that calls for immediate solution, that is, maintaining a background in such a way that the background remains unaffected by a foreground with a view to overcoming the aforesaid drawbacks of the prior art.

SUMMARY

In view of the aforesaid drawbacks of the prior art, an objective of the present invention is to provide a method and device for maintaining an image background by a plurality of Gaussian models. A primary Gaussian model is established to maintain the image background. Two secondary Gaussian models are then compared with each other. Learning for the primary Gaussian model is updated by the secondary Gaussian models to update the image background if the two graphic information corresponding to the secondary Gaussian models are both determined to be attributable to the background information.

To achieve these and other objectives, the present invention provides a method for maintaining an image background by a plurality of Gaussian models, includes the following steps. (a) firstly, a device performing the method captures an image frame having a plurality of pixels to obtain a background information; (b) then the device calculates the background information to establish a primary Gaussian model; (c) the device captures a plurality of continuous image frames in a time period to obtain a graphic information, and calculates the graphic information to establish a secondary Gaussian model; (d) the device repeats step (c) to establish a plurality of secondary Gaussian models; and (e) finally, the device compares two of the secondary Gaussian models, updating a learning based on the primary Gaussian model by the secondary Gaussian models upon determination that the graphic information corresponding to the secondary Gaussian models is attributable to the background information, or maintaining the background information of the primary Gaussian model instead of updating a learning based on the primary Gaussian model upon determination that the graphic information corresponding to at least one of the secondary Gaussian models is unattributable to the background information.

To improve the precision with which the image background is maintained, the image background is further maintained by multiple Gaussian models. Background information is then calculated, so as to establish a primary Gaussian model. Afterward, the edge of a moving object is obtained by frame differencing and then recorded. During a learning process based on the primary Gaussian model, the edge of the moving object is neglected, thereby avoiding the misinterpretation of learning which might otherwise occur because the marginal color of the foreground approximates the color of the background.

To achieve these and other objectives, the present invention provides a device for maintaining an image background by multiple Gaussian models, including: a capturing module for capturing an image frame including multiple pixels so as to obtain a background information and capturing multiple continuous image frames in a time period so as to obtain multiple graphic information; a calculating module connected to the capturing module and configured to calculate the background information so as to establish a primary Gaussian model and calculate the graphic information so as to establish multiple secondary Gaussian models; a storage module connected to the calculating module and configured to store the primary Gaussian model established and the secondary Gaussian models established; and a learning module connected to the storage module, characterized by two-way transmission between the learning module and the storage module, and configured to compare two said secondary Gaussian models, update learning based on the primary Gaussian model by means of the secondary Gaussian models and store a updated learning result into the storage module a updated learning result upon determination that the graphic information corresponding to the secondary Gaussian models are both determined to be attributable to the background information, and maintaining the background information of the primary Gaussian model instead of updating a learning based on the primary Gaussian model upon determination that at least one of the graphic information corresponding to the secondary Gaussian models is unattributable to the background information.

The present invention discloses creating a primary Gaussian model of a background image, obtaining a result of comparison of multiple secondary Gaussian models, updating a learning based on the primary Gaussian model by the secondary Gaussian models upon determination that graphic information corresponding to the secondary Gaussian models is attributable to the background information, thereby circumventing errors which might otherwise occur when learning precedes differentiation of a background from a foreground according to a weight.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description which is given below for illustration only, and thus is not limitative of the present invention, wherein.

DETAILED DESCRIPTION

Reference will now be made in detail to the present preferred embodiments of the invention, examples of which are illustrated in the accompanying drawings. Wherever possible, the same reference numbers are used in the drawings and the description refers to the same or the like parts.

Figure 3:
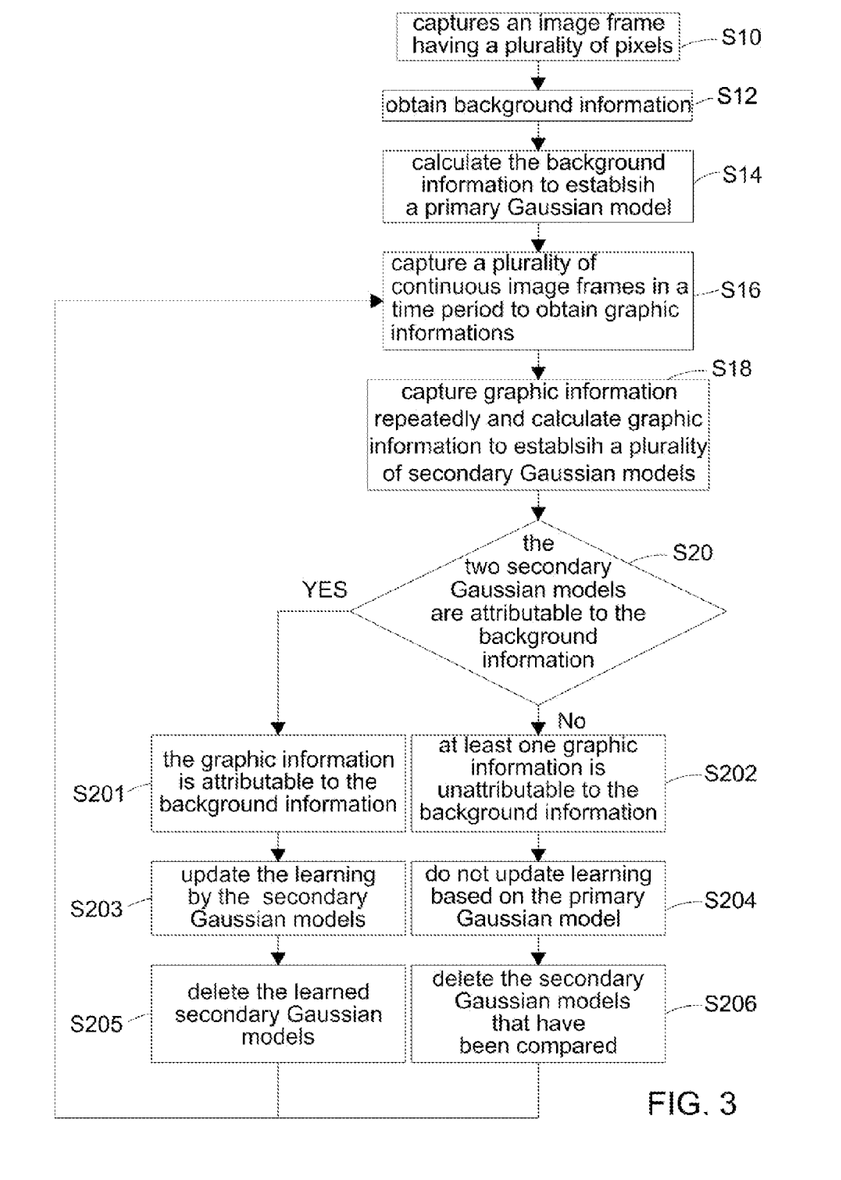
FIG. 3 is a flowchart of a method disclosed in a first embodiment of the present invention.
Figure 4:
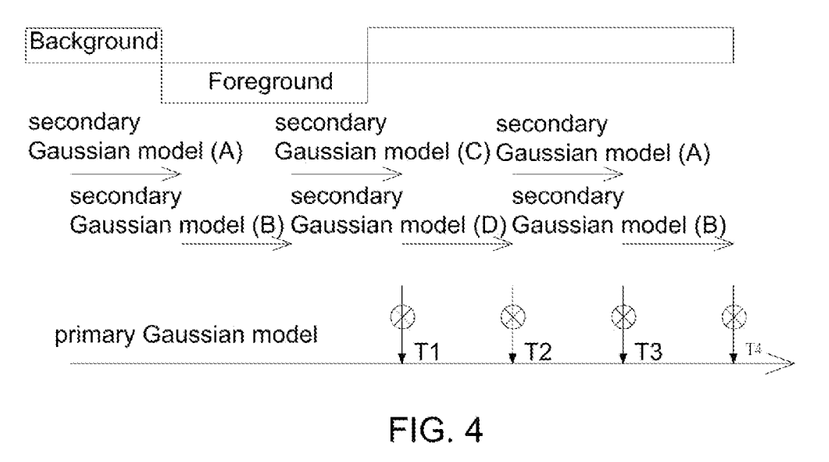
FIG. 4 is a schematic view of Gaussian model-based learning according to the present invention.

Referring to FIG. 3 and FIG. 4, FIG. 3 is a flowchart of a method according to a first embodiment of the present invention, and FIG. 4 is a schematic view of Gaussian model-based learning model according to the first embodiment of the present invention.

To maintain a background of an image precisely, the present invention provides a method for maintaining an image background by multiple Gaussian models utilizing to a device. The method includes the following steps.

S10: the device captures an image frame, and the image frame has a plurality of pixels. The device for capturing the image frame, for example, may be a video surveillance system. Once the video surveillance system is turned on, the video surveillance system will start to capture an image frame having multiple pictures, wherein each of the pictures includes a plurality of pixels. Hence with regard to the image frame to be captured by the powered-on video surveillance system, the starting point of a process of establishing an image background is set to an initial value.

For instance, if the image frame to be captured by the video surveillance system is a blank wall without any moving object or fixture thereon, a background image will be established from the blank wall. If, prior to commencement of the process of establishing the background image, a painting is fixed on the wall, the background image thus the established background image will include the painting fixed on the wall.

S12: the device obtains background information. Upon determination of the background image, the background information includes a plurality of pixels is obtained. The background information is not limited to any color representation. Normally, RGB representation is used. Alternatively, YUV or YCbCr representation is used.

RGB representation involves combining three element colors in different ratios to form light of different colors, which is typical of color information. For example, in a 24-bit mode, RGB values of red, green and blue are represented by the 24 bits (24 bpp), that is, 3 bytes (0~255).

YUV is a method for encoding colors. YUV is a generic title that refers to different types of encoding of color space of true-color, such as Y'UV, YUV, YCbCr, or YPbPr. The letter "Y" denotes luminance or luma. The letters "U" and "V" denote hue and chrominance (or chroma), respectively. The methods of color representation are interchangeable; for example, YUV representation can be replaced by RGB representation.

YCbCr refers to an absolute color space and is a version of compressed and shifted YUV. The letter "Y" of YCbCr bears the same meaning as the letter "Y" of YUV. The combined letters "Cb", "Cr" and "UV" denote color. Blue hue is denoted by "Cb" and red hue by "Cr". Likewise, YCbCr representation can be replaced by RGB representation.

S14: the device calculates the background information to establish a primary Gaussian model. After selecting a method of color representation, the device calculates the color information of every pixel to establish Gaussian models. For instance, with RGB representation, RGB information of every pixel in the background is calculated and expressed by a Gaussian distribution including an average and a covariance. The average is the RGB value of the corresponding pixel, and the covariance is the scope of the Gaussian distribution. The primary Gaussian model of the background information is formed from Gaussian distributions of each of the pixels.

S16: the device captures a plurality of continuous image frames in a time period, so as to obtain graphic informations. After establishing the primary Gaussian model of the background image, the device captures an image frame in a fixed time period to obtain graphic informations. The image frame captured in the fixed time period has a plurality of pictures, and each of the pictures has a plurality of pixels. The image frame captured in the fixed time period can be expressed by means of the color representation similar to that of the background information. However, the information is likely to be a learning model based on the primary Gaussian model established according to the background information, and thus the color representation of the image frame captured is preferably the same as that of the background information, so as to dispense with a step of interchanging color representation.

S18: the device captures graphic information repeatedly and calculates graphic information to establish a plurality of secondary Gaussian models. Upon acquisition of the graphic information captured during a fixed time period, the graphic information is calculated such that multiple secondary Gaussian models can be established. Unlike the primary Gaussian model, the secondary Gaussian models are established continually all the time. For instance, during one second a secondary Gaussian model is established as a result of calculation performed on the graphic information captured, and thus 60 secondary Gaussian models are established within one minute.

S20: the device compares two secondary Gaussian models to determine whether the two secondary Gaussian models are attributable to the background information. After establishing two or more secondary Gaussian models, the device compares the two secondary Gaussian models with each other to determine whether the two secondary Gaussian models are attributable to the background information. The determination that the graphic information corresponding to the secondary Gaussian models is attributable to the background information equates to a determination of a specific proportion of the average of one of the graphic information to the covariance of another one of the graphic information. Upon an affirmative determination, the graphic information corresponding to both the primary and secondary Gaussian models are considered attributable to the background information, and learning based on the primary Gaussian model is updated. By contrast, learning is not required upon a negative determination.

Comparing two secondary Gaussian models involves determining how long a new image should overstay in order for the new image to be considered attributable to the background. For example, select two adjacent secondary Gaussian models to be compared; and, owing to their proximity, the time interval involved is relatively short and thus the two adjacent secondary Gaussian models are likely to be considered attributable to the background information, and in consequence a learning process based on the secondary Gaussian models is updated by the primary Gaussian model. By contrast, if two spaced-apart secondary Gaussian models are selected to be compared, the time interval involved is long, which means that a new image has to overstay for a long time period in order for the new image to be considered attributable to the background information.

Referring to FIG. 4, which is a schematic view of two spaced-apart secondary Gaussian models according to the present invention. Gaussian models (A), (B), (C), and (D) are established by calculating graphic information of continuous images captured during identical fixed periods of time. Assuming that the secondary Gaussian models (A) to (D) are established during a cycle, the secondary Gaussian model (A) is compared with the secondary Gaussian model (C), and the secondary Gaussian model (B) are compared with the secondary Gaussian model (D). The secondary Gaussian model (C) established in a preceding cycle are compared with the secondary Gaussian model (A) established in a subsequent cycle. Comparison is continuously performed so as to allow the updating of the image background to take place without delay.

S201: the device determines that the graphic information is attributable to the background information. Two secondary Gaussian models are compared with each other. For example, two spaced-apart secondary Gaussian models are selected to be compared, as shown in FIG. 4. Both the secondary Gaussian model (C) and the secondary Gaussian model (A) are considered attributable to the background information upon: affirmative determination of a specific proportion of the average of the graphic information of the secondary Gaussian model (C) to the covariance of the graphic information of the secondary Gaussian model (A); or affirmative determination of a specific proportion of the average of the graphic information of the secondary Gaussian model (A) to the covariance of the graphic information of the secondary Gaussian model (C).

S203: the device updates the learning based on the primary Gaussian model by the secondary Gaussian models. For example, two spaced-apart secondary Gaussian models are selected for comparison, as shown in FIG. 4. After the secondary Gaussian model (A) have been compared with the secondary Gaussian model (C), the primary Gaussian model of the background information is updated by making reference to the secondary Gaussian model (A) upon determination that the secondary Gaussian model (A) and the secondary Gaussian model (C) are attributable to the background information. After the secondary Gaussian model (B) have been compared with the secondary Gaussian model (D), the primary Gaussian model of the background information is updated by making reference to the secondary Gaussian model (B) upon determination that the secondary Gaussian model (B) and the secondary Gaussian model (D) are attributable to the background information. By this means, updating and learning of the image background is continuous.

S205: the device deletes the learned secondary Gaussian models. The secondary Gaussian models established are stored in temporary files in a memory. To circumvent insufficient memory capacity which might otherwise result in failure to store the secondary Gaussian models continuously established, any learned secondary Gaussian models are removed from the memory as soon as learning is done and the secondary Gaussian models of the primary Gaussian model have been updated. For instance, in step S203, after the secondary Gaussian model (A) have been compared with the secondary Gaussian model (C) and both have been considered attributable to the background information, and the primary Gaussian model of the background information has been updated by making reference to the secondary Gaussian model (A), the secondary Gaussian model (A) is deleted. The secondary Gaussian model (C) will only been removed from the memory after the secondary Gaussian model (C) have been compared with the secondary Gaussian model (A) established in the subsequent cycle.

S202: the device determines that at least one graphic information is unattributable to the background information. After step S20 is complete, two secondary Gaussian models are compared with each other. Upon determination of the absence of a specific proportion of the average of the graphic information of one of the two secondary Gaussian models to the covariance of the graphic information of the other secondary Gaussian model, at least a graphic information is considered unattributable to the background information.

S204: the device does not update learning based on the primary Gaussian model. After step S202 is complete, the primary Gaussian model is not updated.

S206: then the device deletes the secondary Gaussian models that have been compared. For instance, two spaced-apart secondary Gaussian models are selected to be compared. The secondary Gaussian model (A) is removed from the memory after the secondary Gaussian model (A) have been compared with the secondary Gaussian model (C) and upon determination that the secondary Gaussian model (A) and the secondary Gaussian model (C) are unattributable to the background information. The secondary Gaussian model (C) will be removed from the memory only after the secondary Gaussian model (C) have been compared with the secondary Gaussian model (A) established in the subsequent cycle.

Figure 5:
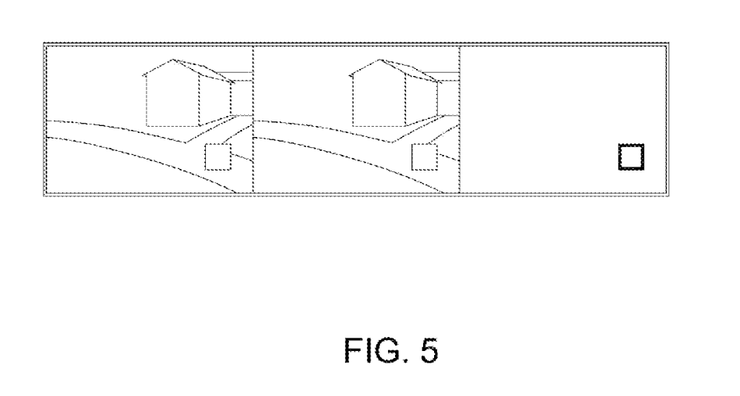
FIG. 5 is a schematic view of frame differencing.

Referring to FIG. 3 and FIG. 5, FIG. 3 is a flowchart of a method disclosed in a first embodiment of the present invention, and FIG. 5 is a schematic view of frame differencing.

To maintain an image background by multiple Gaussian models, the method disclosed in the first embodiment of the present invention further includes step S14 whereby, using frame differencing, the edge of a moving object is neglected during a learning process based on the primary Gaussian model so as to prevent misinterpretation.

With the method of the present invention, the establishment of a background model and the frame differencing take place simultaneously, and the outcome is shown in the right diagram in FIG. 5, that is, the edge of the moving object is obtained, recorded, and omitted during background learning; the method of the present invention therfore efficiently prevents intrusion of the marginal color of the foreground into the color of the background when the former approximates to the latter, and thereby prevents errors arising from the updating of the background. The remaining steps disclosed in the second embodiment are the same as that of the first embodiment, and are therefore not described in detail herein.

Figure 6:
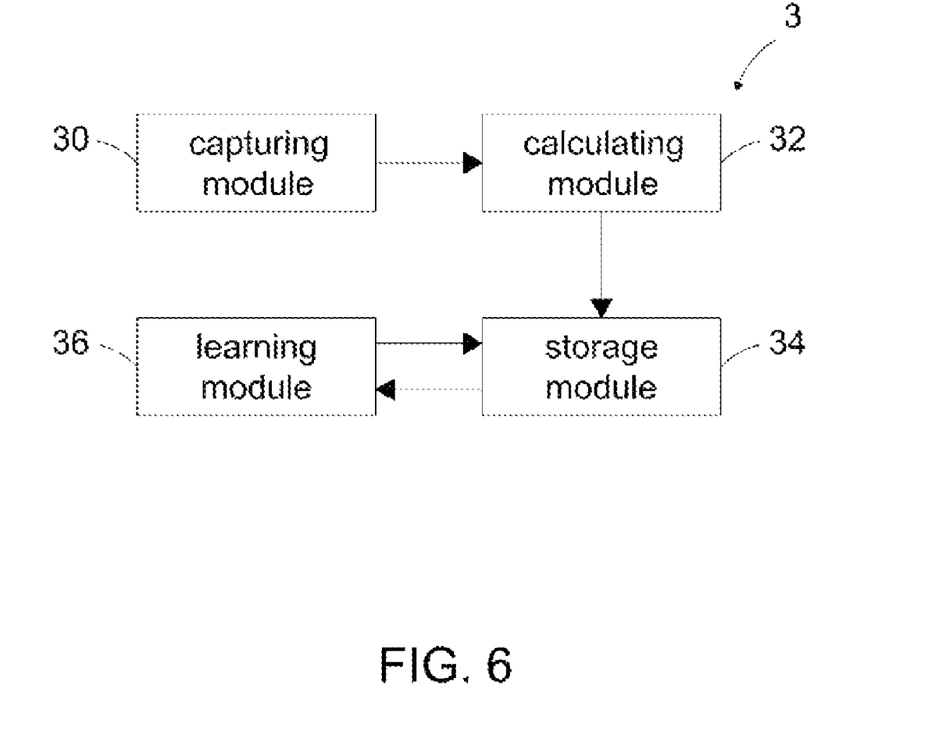
FIG. 6 is a schematic view of a device disclosed in a second embodiment of the present invention.

Referring to FIG. 6, which is a schematic view of a device disclosed in a second embodiment of the present invention.

The present invention provides a device 3 for maintaining an image background by multiple Gaussian models. The device 3 includes a capturing module 30, a calculating module 32, a storage module 34, and a learning module 36.

The capturing module 30 captures an image frame having multiple pixels to obtain background information, and then captures a plurality of continuous image frames in a time period to obtain a plurality of graphic informations. For example, the device 3 can be a video surveillance system, in which the capturing module 30 captures the image frame. By analyzing the image frame captured, the device 3 is able to obtain initial background information and multiple graphic information of an object that first appears in the image frames.

The background information and the graphic information relate to an image having a plurality of pictures. Each of the pictures includes a plurality of pixels. Each of the pixels can be selectively expressed by color representation, for example, RGB representation, YUV, and YCbCr are in wide use. The aforesaid ways of color representation are interchangeable rather than irreplaceable.

The calculating module 32 is electrically connected to the capturing module 30. Information obtained by the capturing module 30 is sent to the calculating module 32. The calculating module 32 then calculates the background information to establish a primary Gaussian model, and calculates the graphic information to establish multiple secondary Gaussian models. For instance, if RGB representation is used, a Gaussian distribution based on the Gaussian models established includes information relating to an average and a covariance.

The storage module 34 is electrically connected to the calculating module 32 to store the primary Gaussian model established by the calculating module 32 and the secondary Gaussian models established by the calculating module 32.

The learning module 36 is electrically connected to the storage module 34 and communicates with the storage module 34 in a bidirectional manner. The learning module 36 is used to compare two secondary Gaussian models retrieved from the storage module 34, update learning based on the primary Gaussian model by the secondary Gaussian models and store in the storage module 34 a updated learning result upon determination that the two graphic information corresponding to the two secondary Gaussian models are both attributable to the background information, and maintaining the background information of the primary Gaussian model instead of updating a learning based on the primary Gaussian model upon determination that at least one of the graphic information corresponding to the secondary Gaussian models is unattributable to the background information.

The determination that the graphic information corresponding to the secondary Gaussian models is attributable to the background information equates determination of a specific proportion of the average of one of the graphic information to the covariance of another one of the graphic information. Upon an affirmative determination, the graphic information corresponding to both the primary and secondary Gaussian models are considered attributable to the background information, and learning based on the primary Gaussian model is updated. By contrast, learning is not required upon a negative determination.

Comparing two secondary Gaussian models equates comparing adjacent or spaced-apart secondary Gaussian models. In this regard, the second embodiment is the same as the first embodiment and thus is not described in detail.

In a conventional mixed Gaussian model, learning occurs with regard to the background and involves all of the pixels of every picture, whether the pixels belong to the foreground or the background. Hence, an overstayed foreground contributes to misinterpretation of updating and learning of the background. Learning, when carried out by the method and device of the present invention, involves separating learning based on the primary Gaussian distribution from learning related to the foreground, and thus the learning related to the background is unlikely to be affected by the foreground. In so doing, the learning related to the background as accomplished by means of the primary Gaussian model is precise, and there is a relatively low chance of misinterpreting the foreground singled out.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A method for maintaining an image background by a plurality of Gaussian models, comprising steps of:
   (a) capturing an image frame having a plurality of pixels to obtain a background information;
   (b) calculating the background information to establish a primary Gaussian model;
   (c) capturing a plurality of continuous image frames in a time period to obtain a graphic information and calculating the graphic information to establish a secondary Gaussian model;
   (d) repeating step (c) to establish a plurality of said secondary Gaussian models; and
   (e) comparing two of the secondary Gaussian models, updating learning for the primary Gaussian model by the secondary Gaussian models if the two graphic informations corresponding to the two secondary Gaussian models are both attributable to the background information, and maintaining the background information of the primary Gaussian model without updating the learning for the primary Gaussian model if at least one of the two graphic informations corresponding to the two secondary Gaussian models are unattributable to the background information.

2. The method as claimed in claim 1, wherein the background information and the graphic information are described by means of a YUV Gaussian distribution.

3. The method as claimed in claim 1, wherein the background information and the graphic information are described by means of a YCbCr Gaussian distribution.

4. The method as claimed in claim 1, wherein the background information and the graphic information are described by means of a RGB Gaussian distribution.

5. The method as claimed in claim 4, wherein the RGB Gaussian distribution comprises an average being a RGB value of the pixels and a covariance being within a scope of the RGB Gaussian distribution of the pixels.

6. The method as claimed in claim 5, wherein the step of determining if the two graphic informations corresponding to the two secondary Gaussian models are both attributable to the background information is to determine if the average of one of the two graphic information is within a specific proportion of the covariance of the other graphic information.

7. The method as claimed in claim 1, wherein comparing the two secondary Gaussian models is to compare two adjacent instances of the secondary Gaussian models.

8. The method as claimed in claim 1, wherein comparing two of the secondary Gaussian models is to compare two spaced adjacent secondary Gaussian models.

9. The method as claimed in claim 1, further comprising a step of obtaining an edge of a moving object by frame differencing after step (b), and neglecting the edge of the moving object during the learning for the primary Gaussian model after recording the edge of the moving object.

10. The method as claimed in claim 9, wherein the frame differencing comprises creating a current frame and a reference frame in the image frame and calculating a difference of the pixels between the current frame and the reference frame.

11. The method as claimed in claim 1, further comprising deleting the secondary Gaussian model after updating the learning for the primary Gaussian model by means of the secondary Gaussian model.

12. A device for maintaining an image background by a plurality of Gaussian models, comprising:
   a capturing module, capturing an image frame having a plurality of pixels to obtain a background information, and capturing a plurality of continuous image frames in a time period to obtain a plurality of graphic information;
   a calculating module electrically connected to the capturing module, for calculating the background information to establish a primary Gaussian model and calculating the graphic information to establish a plurality of secondary Gaussian models;
   a storage module electrically connected to the calculating module, storing the established primary Gaussian model and the established secondary Gaussian models; and
   a learning module, electrically connected to the storage module, communicating with the learning module in a bidirectional manner, and comparing two of the secondary Gaussian models, wherein a learning for the primary Gaussian model is updated by the secondary Gaussian models and a updated learning result is stored into the storage module if the two graphic informations corresponding to the two secondary Gaussian models are both determined to be attributable to the background information, or the background information of the primary Gaussian model is maintained without updating the learning for the primary Gaussian model if at least one of the two graphic informations corresponding to the two secondary Gaussian models are both determined to be unattributable to the background information.

13. The device as claimed in claim 12, wherein the background information and the graphic information are described by a YUV Gaussian distribution.

14. The device as claimed in claim 12, wherein the background information and the graphic information are described by a YCbCr Gaussian distribution.

15. The device as claimed in claim 12, wherein the background information and the graphic information are described by a RGB Gaussian distribution.

16. The device as claimed in claim 15, wherein the RGB Gaussian distribution comprises an average and a covariance, the average being a RGB value of the pixels, and the covariance being within a scope of the RGB Gaussian distribution of the pixels.

17. The device as claimed in claim 16, wherein to determine if the two graphic information corresponding to the two secondary Gaussian models are both attributable to the background information is to determine if the average of one of the two graphic information is within a specific proportion of the covariance of the other graphic information.

18. The device as claimed in claim 12, wherein comparing the two secondary Gaussian models is to compare two adjacent secondary Gaussian models.

19. The device as claimed in claim 12, wherein comparing two said secondary Gaussian models is to compare two spaced adjacent secondary Gaussian models.

* * * * *